Nov. 17, 1970     D. K. MORTENSEN     3,540,805

ILLUMINATION MEANS

Original Filed June 10, 1965     4 Sheets-Sheet 1

INVENTOR.
DANA K. MORTENSEN
BY Noel J. Conway
ATTORNEY

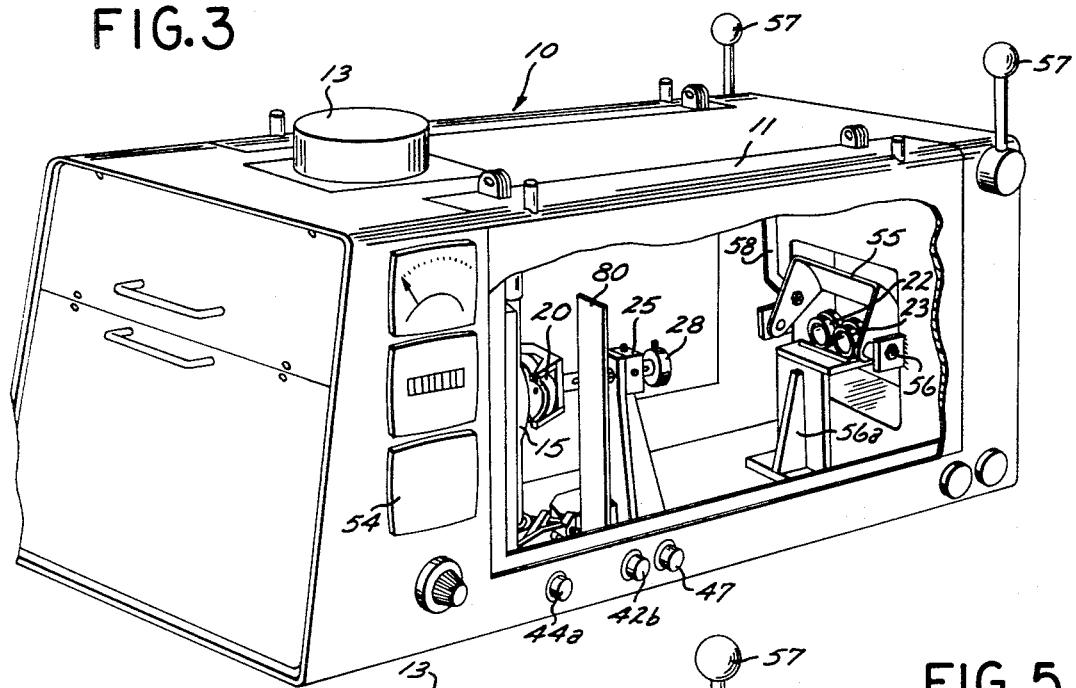
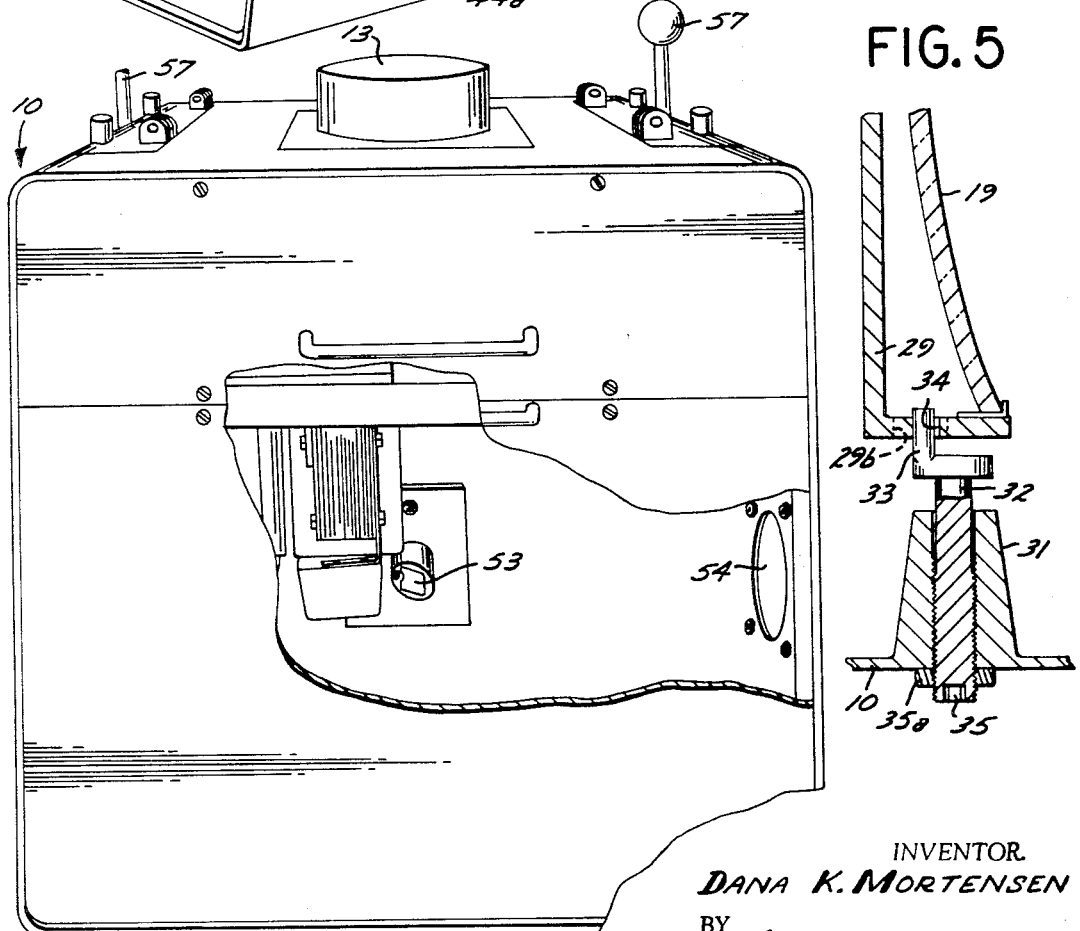

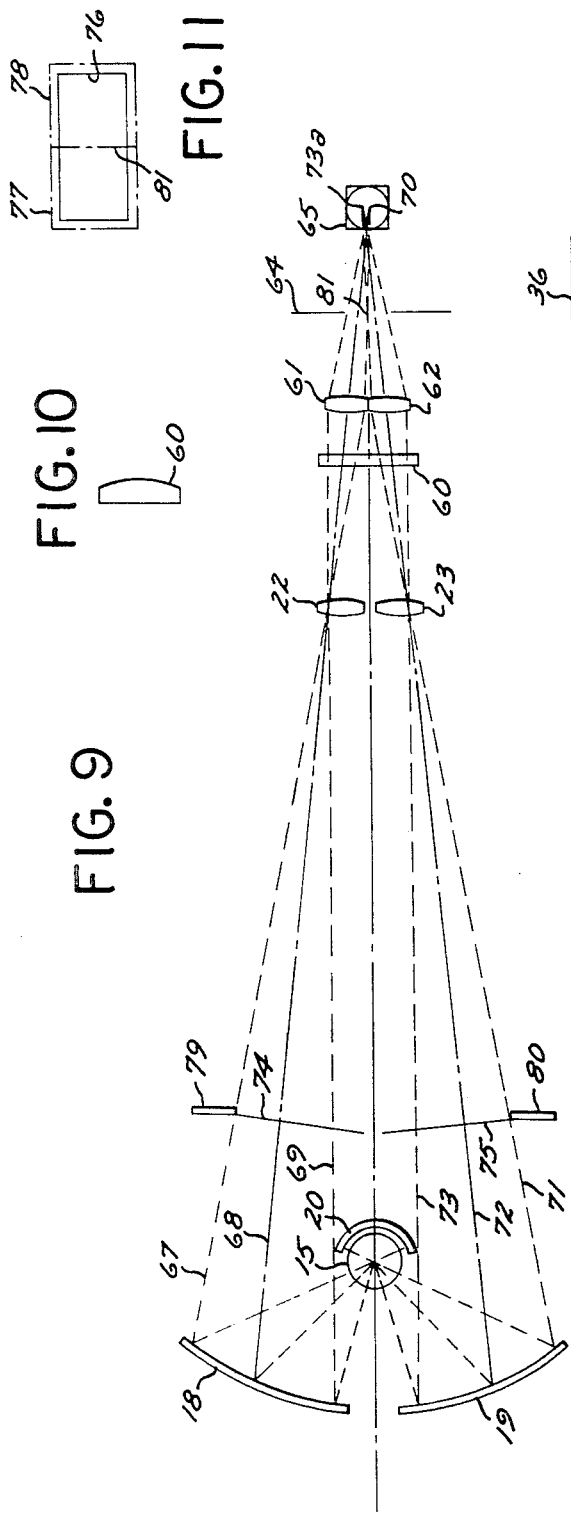
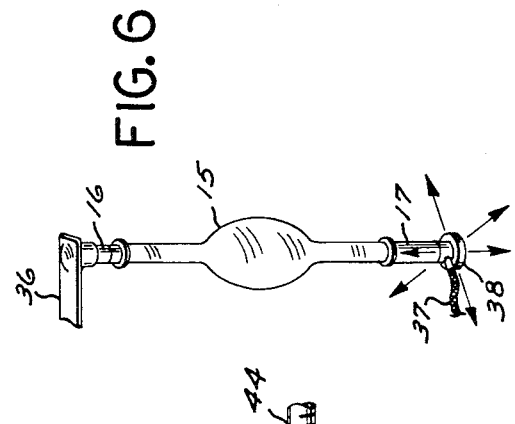
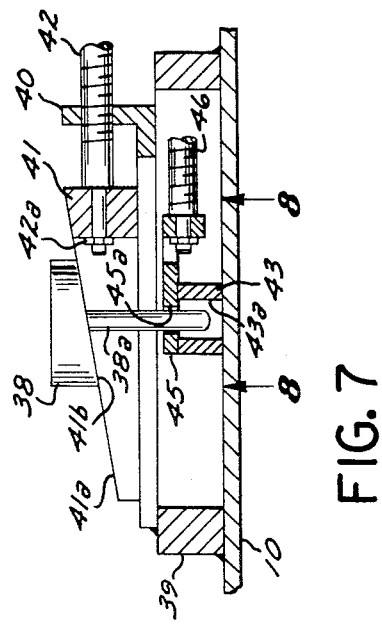

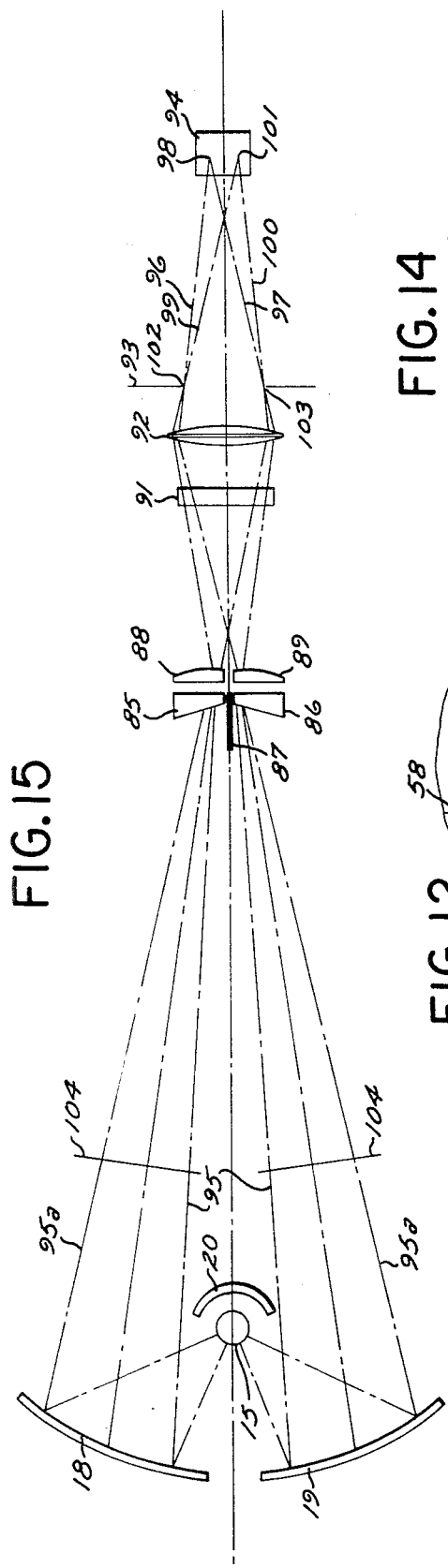
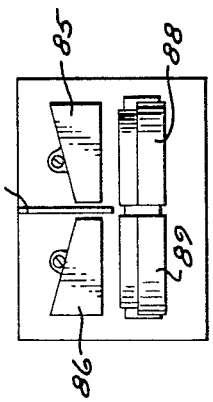
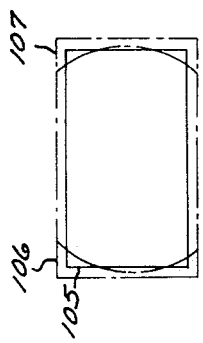
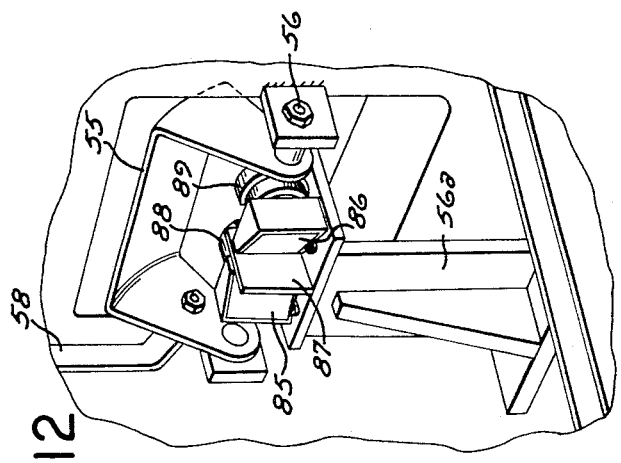
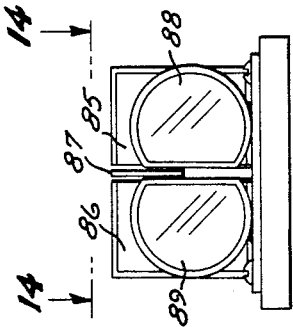

United States Patent Office 3,540,805
Patented Nov. 17, 1970

3,540,805
ILLUMINATION MEANS
Dana K. Mortensen, Huntington Beach, Calif., assignor to Christie Electric Corp., Los Angeles, Calif., a corporation of California
Continuation of application Ser. No. 662,184, Aug. 21, 1967, which is a continuation of application Ser. No. 462,841, June 10, 1965. This application May 22, 1968, Ser. No. 732,494
Int. Cl. G03b 21/14
U.S. Cl. 353—82                    13 Claims

ABSTRACT OF THE DISCLOSURE

An illumination device for illuminating a film aperture of a projector located in apposition to the front of the device with the film plane aperture centered on the optical axis of the device. The device has an adjustable light source on the optical axis with a small secondary mirror directing light rearwardly in the device and a pair of primary mirrors on opposite sides of the optical axis with each primary mirror being mounted for individual adjustment about a separate vertical axis whereby each primary mirror directs light forward in the device in a separate beam which approaches the optical axis as the beam moves forward in the device. Lenses in the front end of the device image in the film plane aperture a cross section of each light beam, each of which cross sections is spaced slightly forward of the respective primary mirror. In one embodiment of the device, there are lenses near the front of the device which turn each of the separate light beams more nearly parallel to the optical axis of the device. In one embodiment of the device, the primary mirrors are adjusted so that one of the separate light beams fill substantially only one-half of the film plane aperture and the other of the separate light beams fills substantially only the other one-half of the film plane aperture. In one embodiment of the device where the separate beams each fill substantially a separate one-half of the film plane aperture and a cross section of each separate beam is imaged in the film plane aperture, there is a vertical light shield located at each such cross section on the side of each beam of light away from the optical axis to limit each light beam at the film plane aperture to only one-half of the film plane aperture.

---

This application is a continuation of Ser. No. 662,184 filed Aug. 21, 1967, now abandoned, which in turn is a continuation of Ser. No. 462,841 filed June 10, 1965 and now abandoned.

This invention relates to illumination means and more particularly to such means which are used to project evenly large amounts of light.

A primary area of use of apparatus incorporating the present invention is in the illumination of film apertures to project the picture on the film onto large screens—for example, in moving picture theaters or in the production of commercial movie film. The large screens used in connection with such commercial motion pictures require large amount of light over a wide area. Of particular importance is the requirement that the light be projected evenly over the large screen.

In the past, carbon arc illumination devices have been used, however, such devices have the disadvantage that they illuminate the screen in a rather uneven manner with the center of the screen being substantially more lighted than the edges of the screen. This poor characteristic is offset somewhat by the use of a "fly's eye" diffuser between the carbon arc and the film plane aperture; however, such a "fly's eye" wastes a considerable amount of light.

The xenon lamp has the advantage as a light source that its arc generates light at nearly a point. Further, such lamp operates without the dirty by-products of the carbon arc lamp, and such xenon lamps do not require operators of the skill that is required by the older type lamp. However, at the present, such lamps are limited in the amount of light that they can generate. Accordingly, of particular importance in the present invention is the manner in which nearly all of the light generated by the xenon lamp is directed through the film plane aperture thereby minimizing the losses of the light.

Not only does apparatus incorporating the present invention use the high percentage of the light generated, but the lens systems incorporated in the apparatus of the present invention images a very even cross section of light at the film plane aperture thereby causing the screen to be more evenly illuminated than in prior devices. Generally speaking, this is accomplished by dividing the light generated by the lamp into two paths and directing the light around the secondary mirror placed in close proximity to the lamp for the purpose of directing light to the primary mirrors for reflection into the lens system—thus eliminating any shadow which would be caused by the secondary mirror. Additionally, the even light distribution is augmented by optically selecting and positioning the lenses in the system so that the light "imaged" at the film plane is the light in a beam cross section plane intermediate the primary mirrors and the film plane—thus taking advantage of the even distribution of the beam at that plane. Additionally, the even distribution is augmented by positioning the lenses of the apparatus to minimize the acuity of the image of the xenon arc in the film plane.

Another requirement in the commercial movie industry arises because the individual frames on the film are very wide in relation to their height. This gives rise to the problem of illuminating a short wide aperture without wasting undue amounts of light. Certain embodiments of the present invention can meet this requirement by incorporating an optical system which—after dividing the light into two paths as mentioned above—directs the light so as to cause the light travelling each path to light up a separate half of the film plane aperture.

With the foregoing in mind, it is a major object of this invention to provide an improved illumination means.

Another object of this invention is to provide a more efficient illumination means.

A further object of this invention is to provide illumination means which will project a very even distribution of light through film onto a screen.

It is still another object of this invention to provide illumination means having provision for quickly and easily replacing the light source of the means.

It is a further object of this invention to provide a low cost, easily maintained illumination means.

Still another object of this invention is to provde illumination means which can illuminate an aperture having a very low height to width ratio without excessive loss of light.

A still further object of this invention is to provide compact illumination apparatus which can project great amounts of light.

Other and further objects of this invention will become apparent in the detailed discussion below in conjunction with the attached drawings wherein:

FIG. 3 is a partially broken away perspective view of the apparatus in FIG. 1 from a different angle;

FIG. 4 is a partially broken away rear view of the apparatus in FIG. 1;

FIG. 5 is an enlarged fragmentary cross sectional view showing the means for adjusting one of the primary mirrors;

FIG. 6 is a perspective view of the xenon lamp illustrating its directions of adjustment;

FIG. 7 is an enlarged fragmentary view of the apparatus showing one means for selectively positioning the lower end of the xenon lamp;

FIG. 8 is an enlarged fragmentary view of one of the slides used in positioning the lower end of the xenon lamp;

FIG. 9 is an optical schematic of the first embodiment of the invention;

FIG. 10 is a schematic side view of a cylindrical lens used in the first embodiment of the apparatus;

FIG. 11 is a view illustrating the lighting of the film plane aperture in the first embodiment of the invention;

FIG. 12 is an enlarged fragmentary view of a portion of a second embodiment of the present invention;

FIG. 13 is an enlarged partial elevation view of the field lenses of the second embodiment of the invention;

FIG. 14 is a plan view of the field and wedge lenses taken along line 14—14 in FIG. 13;

FIG. 15 is an optical schematic of the second embodiment of the present invention; and FIG. 16 is a view illustrating the lighting of the film plane aperture in the second embodiment of the present invention.

Figure 1:
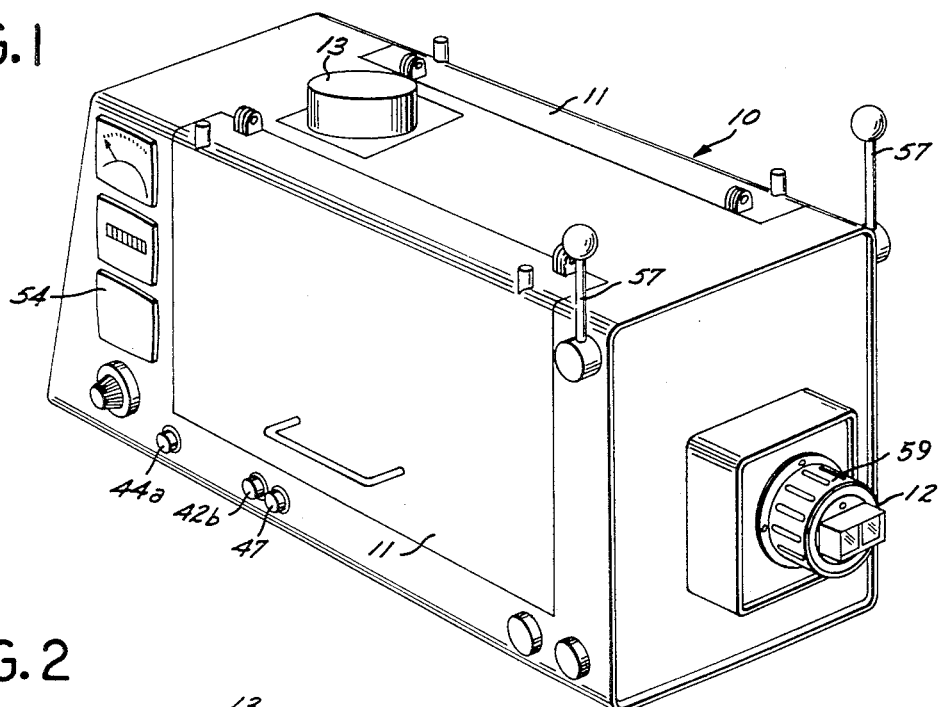
FIG. 1 is a perspective view of a first preferred embodiment of illumination apparatus incorporating the present invention.

Before going into a detailed description of the manner in which the first embodiment of the invention works from an optical standpoint, the preferred embodiment will be described from a mechanical standpoint with reference to the attached drawings.

As disclosed in FIGS. 1 to 4, the apparatus is enclosed in a cabinet designated generally by the arrow 10. Doors 11 are provided on either side of the cabinet to provide access to the interior of the cabinet. Located at the front end of the cabinet 10 is an aperture lens assembly, designated generally by the numeral 12, while at the top of the cabinet is heat vent 13.

Disposed within the cabinet 10 is a xenon lamp 15 which is pivotally mounted at its upper end 16 by means which will be described below. As will be described in further detail below, the lamp 15 is adjusted by positioning lower end 17 of the lamp—the lamp upper end 16 being mounted so as to permit such adjustment.

Located to the rear of the lamp 15 are a left primary mirror 18 and a right primary mirror 19 (as seen from the rear of the apparatus) for reflecting light from the lamp 15 toward the forward end of the cabinet 10 into field lenses 22 and 23 and other suitable lenses for functions to be described further below.

Located in front of the lamp 15 is a secondary mirror 20 which has a concave spherical shape. The mirror 20 is positioned on main optical axis 21 of the unit and positioned in close proximity to the lamp at a poston where light which is emitted forwardly from the lamp is reflected right back through the lamp to the primary mirrors 18 and 19 to be re-directed towards the optical components at the forward end of the cabinet 10.

The secondary mirror 20 is so close to the enlarged center portion of the lamp 15 that the mirror partially encloses said center portion. Accordingly, the mirror 20 is mounted in order that it may be quickly moved out of the way in order to permit changing of the lamp 15, and yet it may be returned quickly to its operating position. To this end, the secondary mirror 20 is secured to the rod 34 which is slidably received in a support 25 for movement along the main optical axis 21 of the apparatus. A slot 26 is provided through the rod 24 and receives a pin 27 therethrough in order to maintain the mirror 20 in proper angular relation to the lamp 15 and the mirrors 18 and 19. At the forward end of the rod 24 there will be noted a stop collar 28 selectively secured to the rod.

For initial adjustments, the mirror 20 is positioned in its desired operating position at which time the collar 28 is loosened and moved to a position where it engages the forward face of the support 25. With the mirror in this condition, the collar 28 is tightened. Thereby, the mirror 20 may be moved out of the way for replacement of the lamp; yet, the mirror 20 may be quickly moved back into its position by returning the mirror rearwardly until the collar 28 engages the forward face of the support 25.

Figure 2:
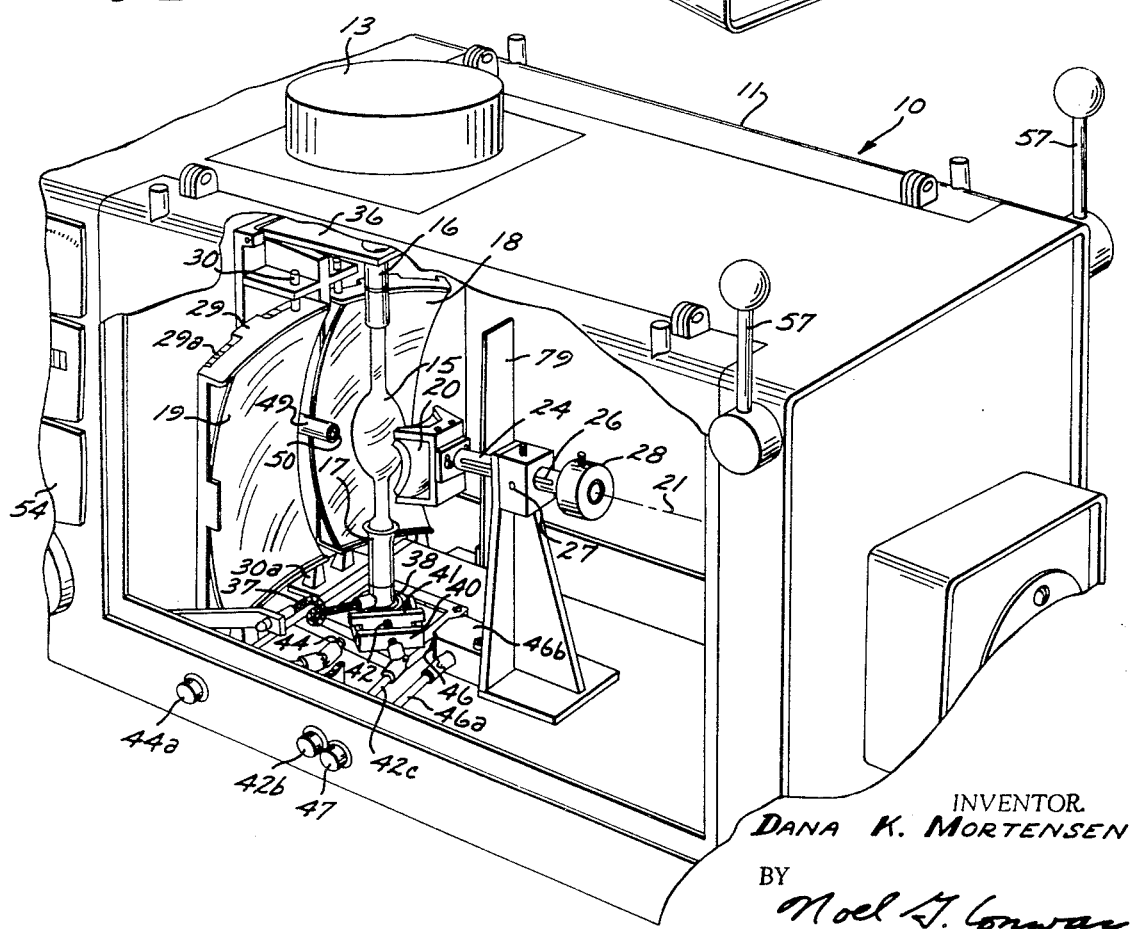
FIG. 2 is a perspective view of the illumination apparatus in FIG. 1, which view has been partially broken away.

As mentioned generally above, and will be described in further detail below, the primary mirrors 18 and 19 function to direct the light rays around the secondary mirror 20 and its support assembly into the optical components located at the forward end of the cabinet 10. It is important to the efficient operation of the apparatus that the primary mirrors 18 and 19 be rapidly and accurately adjusted to most efficiently direct the light rays. With reference to FIGS. 2 and 5 a preferred manner of adjustably supporting the right primary mirror 19 will be described.

The mirror 19 is held by a mirror support 29 which may be swung about an axis at its inward side. Upstanding stub axle 30 is journaled in the frame of the cabinet 10 as shown in FIG. 2 while an aligned depending stub axle is journaled in upstanding boss 30a secured to the frame at the lower side of the mirror support. The mirror support 29 is spaced rearwardly of the mirror 19 and is provided with openings 29a and 29b at its upper and lower ends respectively to form a chimney for cooling of the mirror. More particularly, air between the mirror 19 and the support 29 picks up heat from the mirror and rises while being replaced by cooler air which, in turn, picks up heat from the mirror.

In order to adjust in the horizontal plane the direction of reflection of the light rays from the mirror 19 there is provided an upstanding boss 31 laterally displaced from the axis of the aforementioned axle 30. The boss 31 threadably receives a threaded shaft 32 having an eccentric pin 33 at the upper end thereof. The eccentric pin 33 is received in a slot 34 in the lower side of the support 29. The dimension of the slot 34 in a direction parallel to the main optical axis 21 of the apparatus is only slightly larger than the diameter of the pin 33. However, the slot 34 extends laterally substantially greater than the diameter of the pin 33. Therefore, when the shaft 32 is rotated the pin 33 will move the mirror support 29 forward or rearward at that point. For the purpose of adjustably rotating the shaft 32, there is socket 35 broached in the lower end to receive an allen wrench. Jam nut 35a functons to lock selectively the shaft 32 in the desired position.

The left primary mirror 18 is supported and adjusted by similar means.

Turning now to the lamp 15 with more particularity electrical power supplied to the electrical contacts at the ends 16 and 17 of the lamp through an upper support 36 and a cable 37 respectively. The electrical power system including elements, such as, transformers for causing the xenon lamp 15 to light are not part of the present invention, and, therefore, are not described in detail.

The positioning of the xenon lamp 15 is important to most efficient operation of the apparatus. Preferably, the upper end 16 of the lamp 15 is received in an upper support 36 which is swingably secured to the frame of the apparatus. The end of the support 36 which receives the upper end 16 may be moved upwardly or downwardly; however, it cannot be moved in a horizontal direction. Accordingly, the positioning of the arc of the lamp 15 is accomplished by moving the lower end 17 horizontally and vertically.

Referring now to FIGS. 2, 7, and 8 the illustrated means for effecting the adjustment of the lower end 17 of the lamp 15 will be described. Naturally, other means for accomplishing the desired vertical and horizontal movement can be used.

The lower end 17 of the lamp 15 is received in a receptacle 38 having a depending index pin 38a on the underside thereof. Secured to the floor of the cabinet 10 is a square frame 39 having fixed to its upper side in a generally diagonal direction a vertical adjustment track member 40. The track member 40 slidably supports vertical adjustment slide 41 having an inclined cam surface 41a thereon disposed to cooperate with inclined cam surface 41b on the lower side of the receptacle 38. Thus (as seen in FIG. 7) movement of the slide member 41 to the left raises the receptacle 38 and movement of the slide member to the right lowers the receptacle. In order to cause this horizontal movement, there is a lead screw 42 threadably received through the track member 40. The lead screw 42 has a reduced end portion journaled in the slide 41 with a snap ring 42a functioning to secure the slide to the lead screw for longitudinal movement together.

In practice, the lamp 15 must be adjusted while it is operating. Accordingly, it is provided that the vertical adjustment may be accomplished by rotation of a knob 42b on the exterior of the cabinet 10, which knob rotates the lead screw through a shaft 42c.

Before describing the mechanism which moves the receptacle 38 in horizontal directions, it would be noted that in FIG. 7 these components have been turned 45° from their normal position for ease of illustration.

Referring now to FIGS. 7 and 8 in particular, there is provided for lateral adjustment of the receptacle 38, i.e., at a right angle to the main optical axis 21, a lateral adjustment slide 43 supported by the floor of the cabinet 10. The slide 43 has a cross slot 43a into which is received the lower end of the index pin 38a. It will be noted that the cross slot 43a has a sufficient length to permit the pin 38a to be displaced forward or rearward as required. Similarly to the vertical adjustment components, a lead screw 44 is journaled to the slide 43 and is operatively connected through shafts to an external knob 44a for adjustment from an external position.

Longitudinal adjustment of the receptacle 38 (and, therefore, the lower end 17 of the lamp 15) is accomplished through the use of a longitudinal adjustment slide 45 disposed at a right angle to the slide 43 and extending parallel to the main optical axis 21 of the apparatus. The slide 45 is shaped substantially the same as the slide 43 and is provided with a cross slot 45a through which is received the pin 38a. The cross slot 45a has a sufficient length to permit movement of the slide 43 to displace the index pin 38a laterally. Forward and rearward displacement of the slide 45 is accomplished through a lead screw 46 journaled to the slide and threadably received through the frame 39. In order that the lead screw 46 may be rotated from a position outside the cabinet 10 there is provided a shaft 46a operatively connected to the lead screw through beveled gears in box 46b. Therefore, rotation of knob 47 on the outside of the cabinet 10 effects rotation of the lead screw 46 as desired.

As mentioned previously, it is important that the lamp 15 be accurately adjusted. Firstly, the efficiency of the system drops off rapidly if the arc is off of the main optical axis of the system. Secondly, the arc head radiates large amounts of heat in certain directions. And, if the arc were to radiate the heat into the secondary mirror and that heat were radiated back into one of the electrodes of the arc, the heat would greatly shorten the life of the lamp. Therefore, it is desired that the arc of the lamp 15 be accurately positioned so that the radiated heat will be reflected between the electrodes of the arc or to either side of the electrodes.

In order to observe the arc during the positioning operation, there is provided a hollow rod 49 extending along the main optical axis 21 of the system. The rod 49 has a small hole 50 at its forward end to allow a small beam of light from the arc of the lamp 15 to travel straight rearward (see FIG. 2). The light beam is impinged upon a beam splitter 53 which reflects a small portion of light at a right angle against the rear side of a screen 54, the front side of which may be observed from the exterior of the cabinet 10. The light beam is very hot and would severely shorten the life of the screen 54 if the full force of the beam were impinged upon the screen. The beam splitter 53 overcomes this difficulty by permitting the major amount of the light beam to continue rearwardly and impinge upon, and absorb by, the relatively heavy back door of the cabinet 10.

With this arrangement, the operator may quickly verify the accuracy of the location of the arc of the lamp and may adjust the position of the arc, if necessary, rapidly.

It is desirable that the light emitting from the front end of the apparatus may be cut off without turning off the lamp 15. To this end, there is provided a shutter 55 pivotally mounted at axis 56 adjacent support 56a on which the field lenses 22 and 23 are mounted. The shutter 55 is moved between the open position disclosed in FIG. 3 and a closed position where the shutter is located in front of the field lenses 22 and 23 by swinging either of handles 57 which are connected to the shutter by a connecting link 58. The handles 57 are secured to a common axle rotatably mounted on the cabinet 10.

As has been mentioned above, the present invention functions to image a very even beam of light at the film plane aperture to project an evenly lit picture on a screen. While the embodiment of the invention just described does not include the projector containing the film plane aperture and the projection lens assembly, the present illumination means are designed for specific types of projection equipment. That is, the optical components of the illumination means are selected and positioned on a basis that when the illumination means is operatively connected to a projector, the film plane aperture and projection lens of the projector will be centered on the optical axis of the illumination means in a predetermined spatial relation to the illumination means and its components. The illumination means is operatively connected to the projector in a conventional manner by positioning male index nose and lens holder 59 in apposition to a female cavity provided on the projector with the optical axis of the illumination means extending through the center of the film plane aperture of the projector. Accordingly, the first embodiment of the present invention will be described from an optical standpoint with reference to the film plane and the projection lens.

Referring now to optical schematic FIGS. 9 and 10, there is disclosed a horizontally disposed cylindrical lens 60 and left and right aperture lenses 61 and 62. These lenses 60, 61, and 62 are located in the forward end of the cabinet 10. They were not illustrated in any of the previously-described since the method of mounting the lenses is not part of the invention, and they could not be conveniently illustrated.

All of the lenses may be single or multiple lenses for particular design requirements or choice. However, they are illustrated in FIGS. 9 and 10 as single lens for simplicity of illustration, e.g., aperture lens 61 could be two tandem lenses. The same statement is applicable to FIG. 15 to be described hereafter.

Disposed in front of the aperture lenses 61 and 62, film plane 64 is represented by a line and projection lens assembly 65 also schematically shown.

FIG. 9 is a plan view optical schematic since it discloses best the manner in which the light rays are treated to accomplish the desired function. An elevation view schematic would not show anything of significance other than the cylinder lens 60 is use to reduce the ratio of the height to width cross sectional dimensions of the total light beam at the film plane.

In FIG. 9 certain primary light rays have been included for purposes of illustration. More particularly, among the light rays impinging upon the left primary mirror are left hand outside ray 67, left hand center ray 68, and left hand inside ray 69. Due to the shape of the mirror 18, these illustrative rays 67, 68, and 69 are part of a converging beam as they proceed forward from the mirror, and the arc of the lamp (as reflected from the mirror 18) is preferably imaged in the left field lens 22. It will be noted that the optical components are positioned such that after the outside ray 67 becomes an inside ray (crossing over at the lens 22) the ray is bent nearly parallel to the main optical axis 21 of the apparatus as the ray passes through the aperture lens 61, the light rays of the arc are re-imaged at point 70 in the projection lens 65.

Similar to the light reflecting off of the primary mirror 18, right hand outside ray, center ray, and inside ray 71, 72, and 73, respectively, are illustrative light rays of the arc directed from the primary mirror 19 toward the right field lens 23. The right hand rays are similarly focused so as to image the arc at the plane of the field lens, and right hand outside ray 71 becomes an inside ray after passing through the field lens. Passing through the aperture lens 62, the rays of the arc are re-imaged at point 73a in the projection lens 65.

Although image point 70 of the left hand beam is on the right side of the projection lens 65 and the image point 73a of the right hand beam is on the left hand side of the projection lens, this is not intolerable since both points are within the projection lens.

As mentioned, the arc of the lamp 15 is imaged both in the field lenses 22 and 23 and in the projection lens 65. However, the optical result of the field lens 22 and aperature lens 61 is such that the light imaged at the film plane 64 is the light at beam cross section plane 74. Therefore, there is a very even distribution on the half of the film plane aperture illuminated by the left primary mirror 18. Similarly, the light imaged in the right side of the film plane aperture appears to come from beam cross section plane 75—completing the even illumination of the film plane aperture. In FIG. 11 full line 76 illustrates the aperture at the film plane. Phantom line 77 illustrates how the light reflecting from the left primary mirror 18 fills the left side of the film plane aperture 76, and the phantom line 78 illustrates how the light reflecting from the right primary mirror 19 fills the right side of the film plane aperture 76.

It is very desirable that there be an indiscernible seam at the juncture of the two beams of light which abut at the film plane aperture. To this end, there is provided a left hand shield 79 and a right hand shield 80 which function to cause the seam at line 81 to be practically unnoticeable. It should be noted that the shield 79 and 80 are located respectively at the position on each light beam from which the light rays focusing at the film plane 64 appeared to come.

Turning now to FIGS. 12 to 16, the second embodiment of the present invention will be described. In the first embodiment it was the purpose of the apparatus to cause the two separate beams of light to join together at the film plane 64 with each beam filling up approximately one half of the film plane aperture. In the second embodiment it is the function of the apparatus to overlap in the film plane aperture the two separate beams of light. However, to accomplish this and yet be able to image the arc of the lamp 15 within the projection lens assembly, the optical system is different.

In the second embodiment, the left and right primary mirrors 18 and 19 are tilted more inwardly in order that the beams of rays will converge more rapidly. Then the rays are turned more nearly parallel to the main optical axis of the apparatus whereupon the separate beams of light may overlap at the film plane aperture and yet still fall within the projection lens assembly.

There are few differences between the mechanical structure used in the second embodiment and the structure used in the first embodiment. In the second embodiment, there is provided on the support 56a, left and right wedge lenses 85 and 86 respectively having a partition 87 there between to eliminate any reflection of light rays from one of the wedge lenses to the other. Located in front of the wedge lenses 85 and 86 are left field lens 88 and right field lens 89 respectively. In this case, it will be noted that the adjacent sides of the field lenses 88 and 89 have been ground off in order to allow the axes of these lenses to be placed closer together.

Located in front of the field lenses 88 and 89 is a horizontal cylinder lens 91. This lens has no effect on the light rays in terms of turning them in the horizontal plane. However, the lens does have the effect of condensing the rays in the vertical plane. That is, the cylinder lens 91 functions to reduce the ratio of the vertical dimension of the light beams over the lateral dimension of the light beam. The second embodiment is designed to be used with a predetermined projector as in the case of the first embodiment. Therefore, in order to complete the description of the second embodiment from an optical standpoint, there is schematically illustrated aperture lens 92, film plane 93 indicated by a line, a projection lens assembly 94.

In the second embodiment each of the beams converge toward each other at an acute angle to the main optical axis, which angle is greater than in the case of the first embodiment. Once each of the beams has converged to a point adjacent to the optical axis, it is desired that the beams be redirected to a direction nearly parallel to the optical axis in order that they may pass through the optical components forward of that point. To this end, the wedge lenses 85 and 86 are provided as shown.

Similarly to the first embodiment, it is preferred that the arc of the light source be imaged at a point optically intermediate the lamp 15, and the aperture lens 92. In this case, the arc is preferably imaged in the wedge lenses 85 and 86 with the respective inside light rays 95 meeting the respective outside rays 95a in the plane in which the wedge lenses 85 and 86 are disposed.

Also, as mentioned previously, it is desired that the arc of the lamp 15 be imaged in the projection lens 94. This is accomplished by the field lenses 88 and 89 and the aperture lens 92 re-imaging the arc as desired.

Referring to FIG. 15, illustrative outside ray 95a traveling from the mirror 19 is identified by the numeral 96 after passing through the right field lens 89 while inside ray 95 travelling from the same mirror is identified by the numeral 97 after passing through said field lens. The rays 96 and 97 are illustrated as focusing at a point 98 in the project lens assembly 94. Similarly, the ray 95 from the mirror 18 is designated as ray 99 after passing through the left field lens 88, and ray 95a from the mirror 18 is identified as ray 100 after passing through said field lens. The rays designated as 99 and 100 meet at point 101 in the projection lens assembly 94. It should be noted that for ease of illustration, in the schematic drawing the points 98 and 101 are further away from the main optical axis of the system in relation to the size of the projection lens assembly 94 than is the actual case. The drawing is to illustrate that there are two separate image points in the projection lens, but both of them are within the projection lens assembly.

In the second embodiment, the best overlapping of the two separate beams of light is accomplished at the film plane 94. In FIG. 15 there is illustrated by a crossing of the rays 96 and 99 at point 102 and the crossing of rays 97 and 100 at point 103 in the film plane.

Further, as in the first embodiment, it is desired that the light rays imaged in the film plane 93 appeared to come from a beam cross sectional plane intermediate the mirrors 18 and 19 and the film plane. This is accomplished characteristics of the field and aperture lenses. In the second embodiment, the rays imaged at the film plane 93 appeared to come from illustrative cross sectional planes 104.

At this point, it should be noted also that it is desired that the aperture lens 92 be located as closely as possible to the film plane 93 (and, therefore, the film plane aperture). This is because the closer the light rays get to the projection lens, the more nearly imaged is the arc of the light source. And, since the light source does not have an even light distribution, the more nearly imaged the light source is, the more apparent are the irregularities. Accordingly, it is preferred that the film plane be located where the image of the arc is the most out of focus. And, as shown in the optical schematic, the arc images become more out of focus as one moves from the projection lens to the aperture lens.

The light beam moving from each of the primary mirrors 18 and 19 inherently has a curved outside. The effect of this was eliminated in the first embodiment by providing the shields 79 and 80 in the area adjacent the planes from which the light imaged at the film plane 64 appeared to come. However, in the second embodiment such shields are not as necessary. Referring to FIG. 16 full line 105 illustrates the shape and size of the film plane aperture. Phantom line 106 illustrates the cross section of the beam being reflected from the left primary mirror 18 while phantom line 107 illustrates the beam cross section of the light reflected from the right primary mirror. As can be seen, there is no overlapping at the four corners of the film aperture, which would make the corners somewhat less illuminated. However, the amount of area involved is so small that practically speaking the screens will be effectively evenly illuminated.

While only a few embodiments of the present invention have been shown and described in detail, it will be apparent to those skilled in the art that such is by way of illustration only, and numerous changes may be made thereto without departing from the spirit of the present invention. Accordingly, it is my intention that the invention be limited solely by the appended claims.

I claim:

1. Illumination means having a horizontal main optical axis for illuminating the film plane aperture of a projector in apposition to the front of said means with the film plane aperture centered on the main optical axis, said means comprising:
   a cabinet;
   a light source disposed on said main optical axis for generating light;
   first optical means including mirror means for directing said light in first and second beams of light forwardly into a film plane aperture of a projector in apposition to the front of the cabinet with the film plane aperture centered on said main optical axis;
   second optical means located in front of said mirror means for imaging in such film plane aperture of such projector a cross section of each of said light beams from a cross section in each respective beam located optically intermediate said mirror means and said second optical means, said beam cross section being located substantially nearer said mirror means than said second optical means, said second optical means including:
      lens means located between said mirror means and said film plane aperture for directing said first beam of light to one-half of said film plane aperture but not the other half, and for directing said second beam of light into said other half of said film plane aperture but not said one half.

2. The means set forth in claim 1 including:
   a first shield means positioned at the point of said cross sectional plane of said first beam of light for preventing light of said beam from traveling into said other half of said film plane aperture;
   and second shield means positioned at the point of said cross sectional plane of said second beam of light for preventing light of said second beam from traveling into said one-half of said film plane aperture.

3. Illumination means having a horizontal main optical axis for illuminating the film plane aperture of a projector in apposition to the front of said means with the film plane aperture centered on the main optical axis, said means comprising:
   a cabinet;
   a light source located in said cabinet on said main optical axis;
   first and second primary mirrors for direction at least a portion of the light forward in said cabinet in first and second converging beams respectively, said first and second mirrors being disposed on opposite sides of said main optical axis, said mirrors extending away from said optical axis and forwardly so that said reflected beams of light travel toward said optical axis as the beams move forward in said cabinet;
   means for mounting said first and second primary mirrors for permitting them to be adjusted to cause said beams to travel toward said optical axis at a greater or a lesser angle;
   and optical means located in said cabinet for directing the light reflected from said primary mirror into a film plane aperture of a projector in apposition to the front of the cabinet with the film plane aperture centered on said main optical axis and for directing the light reflected from said second primary mirror into such film plane aperture, said optical means focusing in said film plane aperture a cross section of each respective beam of light lying in a cross sectional plane of each beam of light optically intermediate said mirrors and the front of the cabinet, said cross section in each respective beam being substantially nearer the respective primary mirror than said optical means;
   a first shield means positioned at the point of said cross sectional plane of said first beam of light for preventing light from said beam from traveling into said other half of said film plane aperture;
   and second shield means positioned at the point of said cross sectional plane of said second beam of light for preventing light of said second beam from traveling into said one-half of said film plane aperture.

4. Illumination means having a horizontal main optical axis for illuminating the film plane aperture of a projector in apposition to the front of said means with the film plane aperture centered on the main optical axis, said means comprising:
   a cabinet;
   a light source located in said cabinet on said main optical axis;
   first and second primary mirrors for directing at least a portion of the light forward in said cabinet in first and second separate beams respectively, said first and second mirrors being disposed on opposite sides of said main optical axis, said mirrors each extending away from said optical axis and forwardly so that each of said reflected beams of light travel toward said optical axis from opposite sides of said optical axis as the beams move forward in said cabinet;
   means for mounting said first and second primary mirrors for permitting them to be adjusted to cause said beams to travel toward said optical axis at a greater or a lesser angle;
   first optical lens means located in said cabinet for directing said first light beam into a film plane aperture of a projector in apposition to the front of the cabinet with the film plane aperture centered on said main optical axis, said first optical lens means being positioned out of the path of said second light beam;
   second separate optical lens means for directing the second light beam into said film plane aperture, said second optical lens means being positioned in said cabinet out of the path of said first light beam.

5. The illumination means set forth in claim 4 including:

aperture lens means positioned between the film plane aperture and said first and second optical lens means;

and said first and second optical means are disposed to direct said first and second light beam respectively into said aperture lens means.

6. The invention set forth in claim 4 wherein:

said first primary mirror images said light source in said first optical means and said second primary mirror images said light source in said second optical means.

7. The illumination means set forth in claim 4 wherein:

said first optical lens means includes a lens structure for directing said first beam of light more parallel to a vertical plane extending along said optical axis; and said second optical lens means includes a lens structure for directing said second beam of light more parallel to said plane.

8. The invention set forth in claim 7 wherein:

said first primary means images said light source in said first optical means lens structure;

and said second primary mirror images said light source in said second optical means lens structure.

9. Illumination means having a horizontal main optical axis for illuminating the film plane aperture of a projector in apposition to the front of said means with the film plane aperture centered on the main optical axis, said means comprising:

a cabinet;

a light source located in said cabinet on said main optical axis;

a secondary mirror disposed immediately in front of said light source for reflecting light from said light source rearwardly;

primary mirror means disposed to the rear of said light source for reflecting rearwardly directed light rays forwardly in two separate beams around the light source and secondary mirror toward the front of the cabinet, said primary mirror means directing each beam toward said optical axis at a predetermined acute angle, said primary mirrors each being individually adjustable about a vertical axis, said primary mirror means imaging the light source at two separate points lying in a predetermined plane and adjacent said optical axis;

first optical means located in the path of said beams for directing each beam in a direction more nearly parallel said main optical axis and into a film plane aperture of a projector in apposition to the front of the cabinet with the film plane aperture centered on the said main optical axis, whereby said means can accommodate a wide range of film plane aperture sizes and height-width ratios by adjustment of said primary mirrors about said vertical axes.

10. The illumination means set forth in claim 9 including second optical means disposed on said optical axis in front of said first optical means for focusing in such film aperture a cross section of each beam from a cross sectional plane intermediate the mirror means and said first optical means.

11. The illumination means set forth in claim 9 wherein:

said primary mirror means is positioned to direct one of said two direct beams into substantially only one-half of the film plane aperture and the other of said two separate beams into substantially only the other half of said film plane aperture.

12. Means for illuminating the film plane aperture of a projector, said means having a main optical axis, said means comprising:

a cabinet;

a light source located in said cabinet on said main optical axis;

means at the front of said cabinet for operatively connecting said cabinet with a projector having a film plane aperture with the film plane aperture on said main optical axis;

a secondary mirror disposed immediately in front of said light source for reflecting light from said light source rearwardly;

primary mirror means disposed to the rear of said light source for reflecting rearwardly directed light rays forwardly in two separate beams around the light source and secondary mirror toward the front of the cabinet, said primary mirror means directing each beam toward such optical axis at a predetermined acute angle;

first optical means disposed near the forward end of the cabinet and adjacent said optical axis for directing each beam in a direction more nearly parallel to said main optical axis;

second optical means located in front of said first optical means for causing said separate beams to overlap such that each beam will substantially fill the film plane aperture of a projector operatively connected to said cabinet, said second optical means focusing in such film plane aperture a cross section of each beam from a cross sectional plane intermediate the mirror means and said first optical means.

13. The invention set forth in claim 12 wherein:

said primary mirror means images said light source in said first optical means.

References Cited

UNITED STATES PATENTS

| | | | |
|---|---|---|---|
| 3,099,403 | 7/1963 | Strawick | 240—47 |
| 3,267,802 | 8/1966 | Noble | 353—102 XR |
| 3,296,923 | 1/1967 | Miles | 353—102 XR |
| 3,302,517 | 2/1967 | Henkel | 353—99 |

FOREIGN PATENTS 1,173,433 2/1959 France.

NORTON ANSHER, Primary Examiner

F. BRAUN, Assistant Examiner

U.S. Cl. X.R.

240—41.3, 44.2, 47; 353—97, 99